(12) United States Patent
Zalevsky et al.

(10) Patent No.: US 8,792,159 B2
(45) Date of Patent: Jul. 29, 2014

(54) DEVICES AND METHODS FOR OPTICAL SIGNAL CONTROL

(75) Inventors: Zeev Zalevsky, Rosh HaAyin (IL); Arkady Rudnitsky, Rehovot (IL)

(73) Assignee: Bar Ilan University, Ramat Gan (IL)

( * ) Notice: Subject to any disclaimer, the term of this patent is extended or adjusted under 35 U.S.C. 154(b) by 302 days.

(21) Appl. No.: 12/401,779

(22) Filed: Mar. 11, 2009

(65) Prior Publication Data

US 2009/0231652 A1 Sep. 17, 2009

(30) Foreign Application Priority Data

Mar. 13, 2008 (IL) .......................................... 190156

(51) Int. Cl.
*H01S 5/00* (2006.01)
*G02F 3/00* (2006.01)

(52) U.S. Cl.
USPC .......................................... 359/344; 359/108

(58) Field of Classification Search
USPC ..................................... 359/108, 341.32, 344
See application file for complete search history.

(56) References Cited

U.S. PATENT DOCUMENTS

| | | | | |
|---|---|---|---|---|
| 4,382,660 A | * | 5/1983 | Pratt et al. ...................... | 359/244 |
| 5,166,946 A | * | 11/1992 | Caldwell ................... | 372/50.121 |
| 5,754,714 A | * | 5/1998 | Suzuki et al. ..................... | 385/5 |
| 6,445,495 B1 | * | 9/2002 | Walker et al. .................. | 359/344 |
| 6,473,541 B1 | * | 10/2002 | Ho ................................. | 385/15 |
| 6,765,715 B1 | * | 7/2004 | DiJaili et al. .................. | 359/344 |
| 6,788,838 B2 | * | 9/2004 | Ho ................................... | 385/15 |
| 6,847,054 B1 | * | 1/2005 | DiJaili et al. .................... | 257/83 |
| 6,853,658 B1 | * | 2/2005 | DiJaili et al. ................. | 372/38.1 |
| 7,126,731 B1 | * | 10/2006 | DiJaili et al. .................. | 359/108 |
| 8,041,169 B2 | * | 10/2011 | Watanabe ..................... | 385/122 |

OTHER PUBLICATIONS

Buhl, L. L. et al., "Ti:LiNbO3 waveguide electro-optic beam combiner," Opt. Letters, vol. 12, No. 10, 778-780 (1987).
Conroy, R. S. et al., "Self Q-switched Nd:YVO4 microchip lasers," Opt. Let., vol. 23, No. 6, 457-459 (1998).
Lee, S. Y. et al., "Transformation between directional couplers and multi-mode interferometers based on ridge waveguides," Opt. Express, vol. 12, No. 14, 3079-3084 (2004).
Nagai, S. et al., "Multimode interference photonic switches (MIPS)," IEEE J. Lightwave Tech., vol. 20, No. 4, 675-681 (2002).
Ono, H. et al., "S-Band Erbium-Doped Fiber Amplifiers with a multistage configuration—design, characterization, and gain tilt compensation," IEEE J. of Lightwave Tech., vol. 21, No. 10, 2240-2247 (2003).

(Continued)

*Primary Examiner* — Eric Bolda
(74) *Attorney, Agent, or Firm* — Patentbar International, P.C.

(57) ABSTRACT

A device for use in optical signal control is presented. The device comprises an amplification waveguide, including a pumpable medium, and a reference and a control inputs and an output selectively allowing transmission of light respectively into and out of said amplification waveguide. The reference input, the amplification waveguide and the output define together a transmission scheme for reference light through the pumpable medium. The control input and the amplification waveguide define a depletion scheme for the pumpable medium and control light. The device thus allows for controlling an output signal, formed by the transmission of the reference light, by controllable depletion of the pumpable medium.

15 Claims, 12 Drawing Sheets

(56) References Cited

OTHER PUBLICATIONS

Yabu, T. et al., "All-optical logic gates containing a two-mode nonlinear waveguide," IEEE J. Quantum Electronics, vol. 38, No. 1, 37-46 (2002).

Yanik, M. F. et al., "All-optical transistor action with bistable switching in a photonic crystal cross-waveguide geometry," Opt. Lett., vol. 28, No. 24, 2506-2508 (2003).

Zalevsky, Z. et al., "All-optical devices and methods for data processing," Israeli Patent Application No. 166810, filed Feb. 10, 2005.

* cited by examiner

DEVICES AND METHODS FOR OPTICAL SIGNAL CONTROL

RELATED APPLICATIONS

This application claims priority to Israeli Patent Application No. 190156, filed on Mar. 13, 2008, which is incorporated herein by reference in its entirety.

FIELD OF THE INVENTION

This invention relates to devices and methods for optical signal control, particularly to elements, systems and methods for data processing, optical computing, and communication.

BACKGROUND OF THE INVENTION

The ability to carry out concurrent large-scale on-chip information processing and multi-channel communication is valued in the information technology. All-optical systems may carry out these tasks at speeds or rates far exceeding electronic counterparts. Typically, light beams which are to be processed by an all-optical device have to non-linearly interact with the electronic subsystem of the device's medium, so as to produce a certain non-linear effect (e.g. two and four waves mixing, frequency doubling, parametric oscillation, etc) on utilization of which the operation of the particular device is based. Accordingly, typical all-optical devices tend to use media with a large non-harmonicity of electronic oscillations. Typical all-optical devices also tend to require intense illumination and a large interaction region for operation.

SUMMARY OF THE INVENTION

There is need in the art for various techniques of optical signal control. The inventors have found a novel technique for efficient optical signal control. This novel technique, in some embodiments, is all-optical and uses a linear medium. The method and device provided by this technique can operate with relatively non-intensive light, small interaction region, and short response time.

The technique of the inventors utilizes the dependence of a signal propagating through a stimulated emission medium, herein called gain medium, on the gain. This dependence is typically non-linear with respect to the gain, or a period of existence of the gain, or a dimension of a region with the gain. The gain medium can be created by pumping a pumpable medium; however the gain does not need to be larger than the light absorption. In other words, the total gain coefficient of the medium within a device can be larger or smaller than one if only the pumped medium has a gain component besides the absorption component (the total gain is a difference of the gain and absorption components). The pumping can be electrical or optical or of any other suitable type. The optical signal control can be realized in a device including the pumpable medium in an amplification waveguide. Herein the meaning of the term "amplification" is tied with the above meaning of gain, i.e. the amplification coefficient can be larger or smaller than one. The optical signal control device also has at least one reference and at least one control input; and it also has an output (signal output). Herein, the inputs allow transmission of light into the amplification waveguide, either by directing light into the waveguide or by coupling light into the waveguide (i.e. coupling by tunneling, for light initially propagating in another waveguide). The inputs may be implemented by optical windows in the waveguide or suitable selection of cladding parameters (e.g. cladding thickness) along a certain region of the waveguide. The inputs are therefore geometrically selective. The inputs can be selective also with respect to a light propagation mode, i.e. they can be relatively well-transmitting for one mode and substantially not transmitting for another mode in case of a multimode waveguide or fiber. As well, the inputs can be frequency and/or wavelength selective.

In particular, in some embodiments, the reference input of the device includes a reference waveguide and a reference coupling junction formed between the reference and the amplification waveguides. The reference coupling junction is adapted for coupling reference light signal from the reference waveguide into the amplification waveguide.

Likewise, the output of the optical signal control device selectively allows transmission of light from the amplification waveguide. The selectivity is geometrical and, possibly, applies to a mode, a frequency, and/or a wavelength of light. The output may include an output waveguide and an output coupling junction formed between the amplification and the output waveguides.

The optical signal control device is configured such that the reference input, amplification waveguide and the device output define a scheme for transmission of reference light through the pumpable medium. The device configuration is selected also such that the control input and the amplification waveguide define a depletion scheme for the pumpable medium and control light.

Thus configured device allows controlling an output signal, formed by transmission of the reference light according to its transmission scheme. The control can be performed by controlling a level of control signal: if this level is "low" the reference light signal will be amplified by the pumped medium more than if this level is "high". Indeed, the higher will be the level of the control signal, the greater will be the depletion of the pumped medium and the lower will be the intensity level of the output signal.

In this connection, it should be considered that a response of the pumped medium to a change in the control signal depleting the medium occurs relatively fast. In particular, such response is typically delayed less from a change in control signal (or at least in an increase in control signal) than responses which are due to various non-linear effects. In the technique of the inventors the response is caused in the following way: a change of the control signal causes a change in the level (intensity) of the stimulated emission (if the pumpable medium is pumped); therefore it causes a change in the level of that stimulated emission that is due to the reference signal. While the amplification factor of the pumped medium is a nonlinear function of the intensity of light passing through the medium, this non-linearity is not due to a non-linear effect from the list given above. For example, the change in the amplification factor is typically almost independent from the refraction index of the medium.

In the case of optical pumping the optical signal control device includes a pump input arranged to selectively allow transmission of pumping light into the amplification waveguide. The pump input and the amplification waveguide define a pumping scheme for the pumpable medium of the device. The optical pumping is used in some preferred embodiments. The optical pumping may be performed by coherent light provided by a coherent light source (coherent pump). Either coherent or incoherent pump may be a part of the device.

The pumping scheme can be restrictive towards a propagation of pumping light out of the amplification waveguide. For example, a beam of pumping light can enter the amplification waveguide in a non-transmitting direction of this waveguide. In a particular case, the beam of pumping light can be directed into the waveguide perpendicularly or at a non-zero angle to its, possibly local, transmitting direction. Furthermore, the amplification waveguide may form a resonator for the pumping light propagating by the pumping scheme.

In some embodiments, the amplification waveguide is closed-circuit, e.g. a ring.

In some embodiments, the depletion scheme is restrictive towards a propagation of the control light out of the output.

The amplification waveguide may be a single-mode.

In some embodiments, the control input includes a control waveguide and a control coupling junction formed between the control and the amplification waveguides.

The device may include a drain output selectively allowing transmission of the control light from the device, the drain output being downstream of the depletion scheme. The drain output may include a drain waveguide and a drain coupling junction formed between the amplification and the drain waveguides.

In some embodiments, the amplification waveguide has at least two propagation modes, and the control light in the depletion scheme and the reference light in the transmission scheme propagate in different propagation modes.

In some embodiments, for example some logic device embodiments, the device utilizes at least two control inputs arranged to provide one or more depletion scheme. The device is thereby enabled to output logical function NAND of the at least two control signals.

In some embodiments, the control input includes an interference subtractor including a minuend input and two subtrahend inputs.

In one aspect of the invention, there is provided a device for use in optical signal control, the device including an amplification waveguide, including a pumpable or gain medium, and a reference and a control inputs and an output selectively allowing transmission of light respectively into and out of the amplification waveguide, the device being configured such that the reference input, the amplification waveguide and the output define a transmission scheme for reference light through the pumpable medium, and such that the control input and the amplification waveguide define a depletion scheme for the pumpable medium and control light, the device thereby allowing controlling an output signal, formed by the transmission of the reference light, by controllable depletion of the pumpable medium. (Therefore, the output light is to be partially formed by stimulated emission of light).

In another aspect of the invention there is provided a method for use in optical signal control, the method comprising affecting a level of pumping of a pumpable medium with control light so as to control an amplification of reference light transmitted through the pumpable medium, said affecting comprising causing a stimulated emission of light by said control light.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
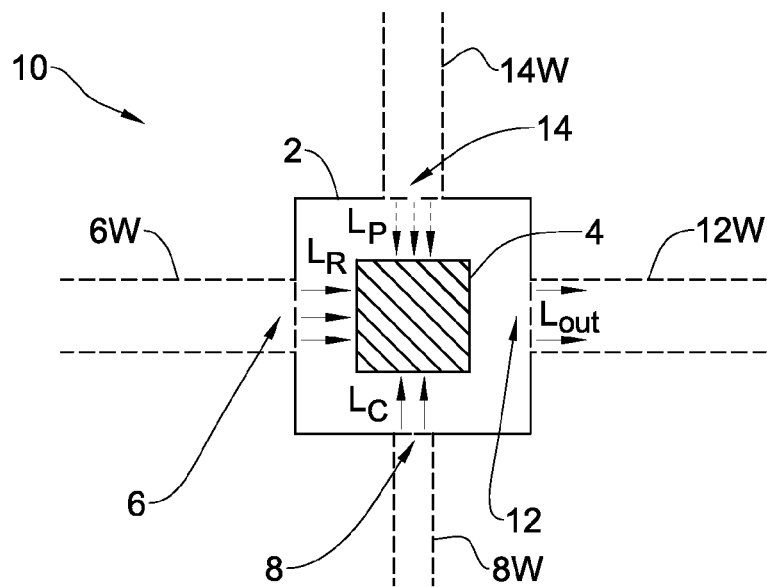
FIGS. 1-3 schematically show different examples of the optical device of the invention.

Referring to FIG. 1 there is schematically shown an exemplary optical device 10 for use in optical signal control. Device 10 includes an amplification waveguide 2 with a reference input 6, a control input 8, and an output 12. Waveguide 2 has thereinside a pumpable medium 4. The inputs and the output are configured as optical windows. The inputs selectively allow transmission of light into waveguide 2; the output selectively allows transmission of light out of waveguide 2. Inputs and the output may be directionally selective. Reference input 6, amplification waveguide 2 and output 12 define a transmission scheme for reference light $L_R$: on its way to the output, light $L_R$ passes through pumpable medium 4. Control input 8 and amplification waveguide 2 define a depletion scheme for pumpable medium 4 and control light $L_C$: this light reaches the pumpable medium and depletes it if it is pumped. Device 10 thereby allows controlling an output signal $L_{Out}$, formed by the transmission of reference light $L_R$, by controllable depletion of the pumpable medium: if signal $L_C$ is higher signal $L_{Out}$ is lower, due to decrease in gain for signal $L_R$.

Optical control device 10 may also include a pump input 14 if medium 4 is optically pumpable and to be optically pumped. The pump input and the amplification waveguide 2 define a pumping scheme for pumping light $L_P$: this light reaches into pumpable medium 4. It should be noted, that optical control device 10 may be include for example an electronic pump input and possibly an electronic pump (not shown) instead or in addition to the optical pump input and respectively the optical pump.

As well, optical control device 10 may be provided with one or more waveguides 6W, 8W, 12W and 14W, respectively called reference waveguide, control waveguide, output waveguide, and pump waveguide. Waveguides 6W and 12W can be used for limiting or precisely determining the transmission scheme; waveguide 8W for limiting the depletion scheme, waveguide 14W for limiting the pumping scheme. The waveguides can be normal or inclined with respect to the amplification waveguide wall. In FIG. 1 the inclination can be used for example for prevention of propagation of pumping light $L_P$ into control waveguide 8W and therefore for prevention of loss of pumping light. Though, it should be noted, that the pump and control inputs may for example include crossed polarizers and therefore prevent the loss of pumping light $L_P$ by leaking into control waveguide 8W (and loss of control light $L_C$ by leaking into pumping waveguide 14W) even if the respective waveguides are provided with no inclination. Somewhat similarly, the control input may include a frequency filter which will prevent propagation of pump light out of the amplification waveguide through this input. In some embodiments the pump light frequency is higher than the control light frequency; in these cases a low pass frequency filter situated in control input 8 can prevent the loss of pumping light. Also, the pump and control inputs may be situated not as in the FIG. 1, opposite one another, but can be shifted and/or disoriented one with respect to the other. For example, the disorientation can be provided by setting up the pumping input in plane of FIG. 1 such that the pump waveguide will "poke through" the view of FIG. 1 (perpendicularly or under a certain angle to this view).

Device 10 may include a drain output for draining light $L_C$ passed through the pumpable medium. This drain output may for example be in the place where input 14 is shown: this input (and possibly the respective waveguide 14W) thus may concurrently serve for the pump light input and for the drain light output. Also, in accordance with the above, the pump input and waveguide may be in a different place/orientation and input 14 and respective waveguide 14W serve for draining the control light.

Figure 2:
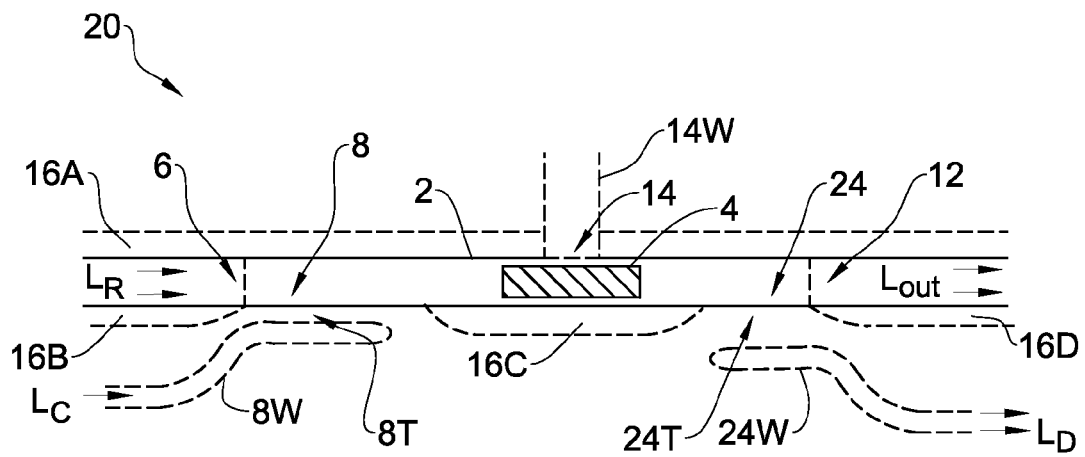

Referring to FIG. 2 there is schematically shown another exemplary device 20 for use in optical signal control. Device 20 also includes amplification waveguide 2 with reference input 6, control input 8, and output 12. Waveguide 2 has pumpable medium 4 thereinside. Waveguide 2 is a two- or multi-mode fiber and optionally has regions of cladding/protective material 16A-16D around it. When present, the protection decreases losses of mode energy during light propagation. Generally, some or all of the light inputs and outputs may be coupling inputs and outputs. In device 20 control light $L_C$ couples (tunnels) to waveguide 2 through a control coupling junction 8T, wherein light $L_C$ is supplied to the control coupling junction by control waveguide 8W. Parameters of the control coupling junction (e.g. its length) are selected such that the coupled control light does not return to waveguide 8W; or returns there, but eventually returns to the amplification waveguide (i.e. light $L_C$ couples from waveguide to waveguide an odd number of times in control input region 8). In some embodiments light $L_R$ and tunneled light $L_C$ are of different modes. Then, coupling junction 8T is selected such that reference light $L_R$ is kept in waveguide 2 and tunnels to waveguide 8W not as much as light $L_C$ tunnels to waveguide 2. Though, pumpable medium 4 is such that it gets depleted by any of the modes—either the mode of light $L_R$ or the mode of light $L_C$. Clearly, in the presence or slightly after the presence of a control light signal the gain for the reference light becomes smaller. This can be sensed by a detector of the appropriate mode in the output of the amplification waveguide 2.

Optionally, device 20 has a drain output 24 which leads light to drain coupling junction 24T and possibly drain waveguide 24W. Parameters of the drain coupling junction are selected such that the one mode, in this case the mode of the control light, tunnels outside of the amplification waveguide more than the other mode, in this case the mode of the output or reference light.

It should be noted, that device 20 may be operated differently: for example, output light may be output not through the amplification waveguide, but by tunneling. The control light in this case could stay in the amplification waveguide. Also, reference light could be input into the amplification waveguide by tunneling. Control light could be input in the amplification waveguide directly (e.g. instead of reference light) then.

Figure 3:
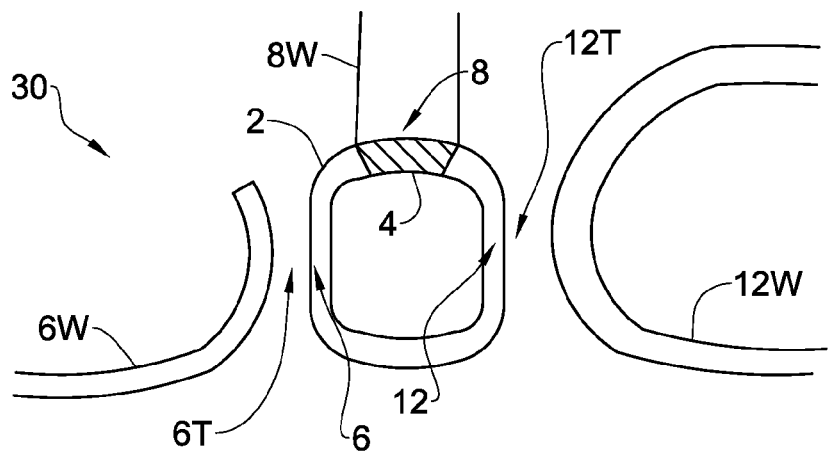

Referring to FIG. 3 there is schematically shown yet another exemplary device 30 for use in optical signal control. Amplification waveguide 2 of this device presents a closed loop. Reference input 6 is supplied by reference light from a reference waveguide 6W, through a reference coupling junction 6T. Control light is supplied through waveguide 8W and input into the amplification waveguide through control input 8. The control light is directed towards a region with pumpable medium 4. In the present example this medium is pumped electrically, by application of current from a current or power supply (not shown on the figure). Output 12 leads to an output waveguide 12W, through an output coupling junction 12T. Waveguide 12W may start at the coupling junction or it may start at another place and carry a signal therein to which a signal tunnel from the closed loop is added. It should be noted that in some preferred embodiments the closed loop forms a resonator for light frequency of reference light input therein.

Figure 4A:
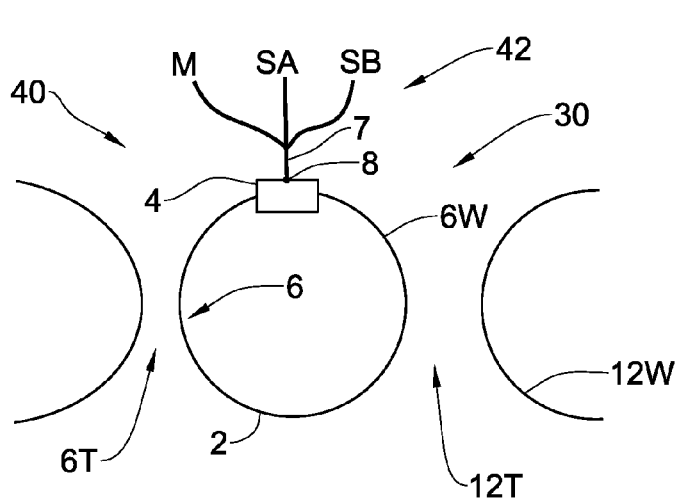
FIG. 4A shows yet another example of the optical device of the invention usable as a logical gate.

Referring to FIG. 4A there is schematically shown an optical gate 40, usable in particular as an AND gate. Within gate 40 there is a portion similar to gate 30. Gate 40 additionally includes a subtractor-type unit 42 or it is coupled to a subtractor-type unit 42. This unit has three inputs, one of which is minuend (M) and two of which are subtrahend (SA and SB), and an output 7. The output signal of this unit is less intense when all three inputs are provided with predetermined signals rather than when minuend input is provided with the predetermined signal and at least one of the subtrahend is not provided with its signal. Accordingly, gate 40 may serve as an AND gate for signals at subtrahend inputs: when the minuend and both subtrahend input signals are present, the amplification of pumped medium 4 is larger than when either of subtrahend signals is not present; and the output signal that is generated in waveguide 12W is also larger in the former case than in the latter case. Moreover, when ring 6W is a resonator the output signal can be much larger.

Figure 4B:
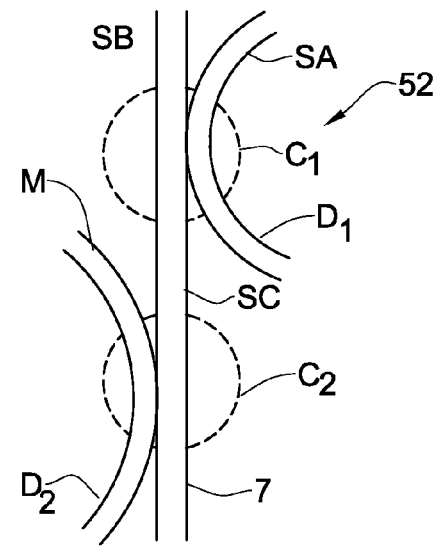
FIG. 4B presents a coupler usable in the device of FIG. 4A in more detail.

In FIG. 4B there is shown a coupler 52 usable as the subtractor-type unit 42. The coupler has three inputs M, SA and SB, output 7, and two drain waveguides $D_1$ and $D_2$. The minuend input M is a baseline input: it is steadily supplied with light of intensity $In_M$. Each of the two subtrahend inputs SA and SB may be supplied with light of intensity $In_M/2$. The coupler is such that it divides a single mode propagating from either input in two equal intensity modes in coupling regions $C_1$ and $C_2$. One of the new modes, in particular the one that couples from waveguide of the single mode to its own waveguide, acquires a delay of 90 degrees in phase relatively the other divided mode. In such setup a first and a second mode of intensity $In_M/2$ provided to respectively inputs SA and SB will add in a third mode in a region SC if the first mode is provided with a 90-degrees lag in phase from the second. This third mode will have energy $In_M$. Drain waveguide $D_1$ will not obtain a mode because of destructive interference. Mode with energy $In_M$ provided at input M can be provided with a lag of 90 degrees from the third mode (summary mode). Due to coupling in region $C_2$, the mode will acquire the energy of the summary mode and will be guided to drain $D_2$. Signal at output 7 of subtractor-type unit 52 will have zero intensity $E_3 = In_M - In_{SA} - In_{SB}$ with so provided inputs. If inputs are different, this intensity will typically be larger than zero (unless intensities and phases are specifically selected to provide zero intensity). Therefore, unit 52 is usable in an AND element of the type described in FIG. 4A.

Figure 5:
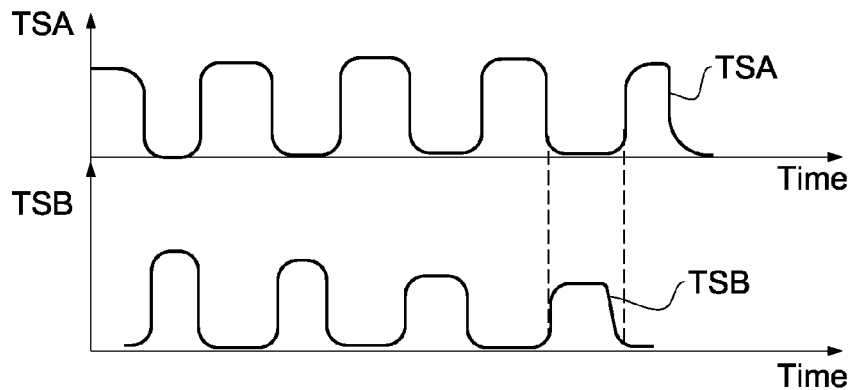
FIG. 5 shows time diagrams of two signals capable of serving as logical input signals.

The inventors have considered also an example in which device 52 is used differently: the minuend input M is fed with a baseline light, and either of the subtrahend input (or each of them) is fed with a signal presenting a set of pulses in the form of pulse train. The signals, that are to be provided to different minuend inputs, are tied with each other so as to work as logical signals. In FIG. 5 exemplary two trains TSA and TSB, being in a relationship enabling using these trains for logic, are illustrated. For each train, a delay between two pulses equals a duration of a single pulse. The input signals, when the logic requires that they are provided to the subtrahend inputs concurrently, are synchronized: they are shifted in time with respect to each other. The shift approximately equals the length (duration) of the single pulse of the trains (it should be noted that the shift is measured not at inputs but at a region where signals can meet, for example at region $C_1$ in FIG. 4B).

With respect to the operation of the pulse train logic, it accords to the principles specified above: logical (minuend) inputs control the gain of gain medium, and, unless both of the inputs are present, the gain is affected by the baseline light and is low and does not allow a reference signal provided at the reference input (e.g. input 6 in FIG. 4A) to rise high and result in a high output.

Figure 6A:
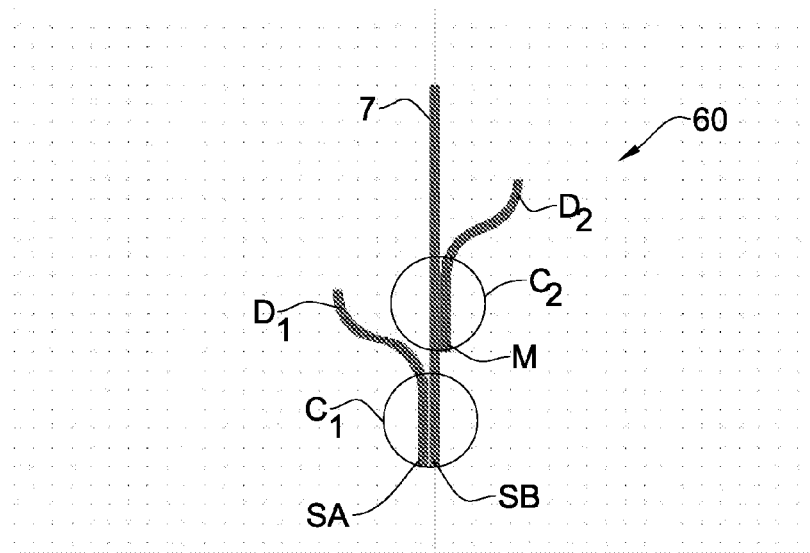
FIG. 6A illustrates a waveguide layout of a coupler similar to the coupler of FIG. 4B and usable for defining logic functions.
Figure 6B:
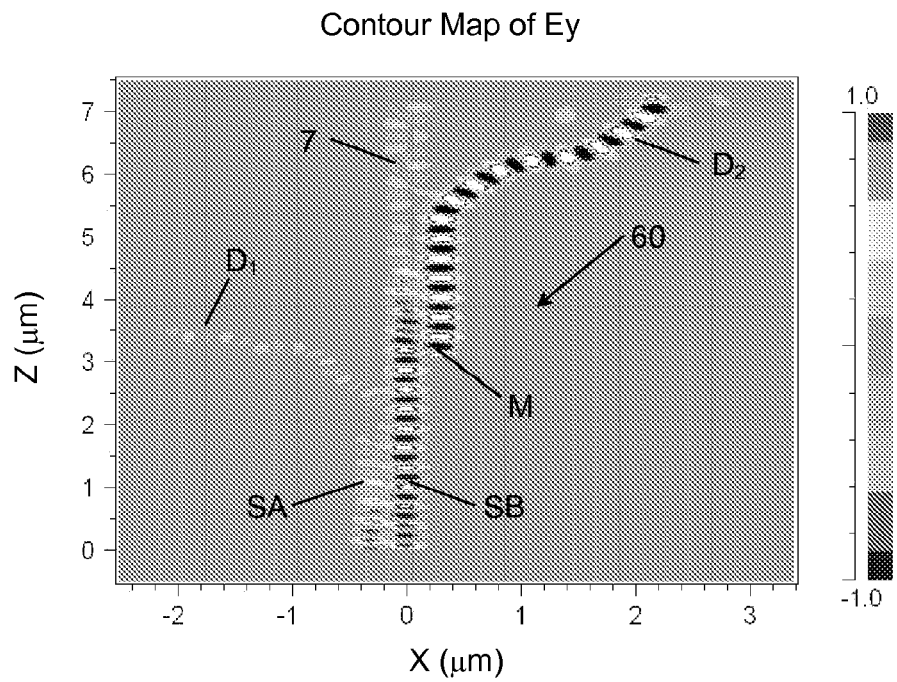
FIGS. 6B-6D show results of a simulation of propagation of light through the coupler of FIG. 6A for cases of different combinations of signals provided to the coupler's inputs.

Referring to FIGS. 6A-6D, there are presented results of a simulation of an interference device 60 of the type shown in FIG. 4B. In FIG. 6A a layout of the interference device is shown. The layout of device 60 is as of device 52, but it is rotated upside down when compared to device 52. The layout axis is measured in microns. FIG. 6B illustrates the case in which all inputs are fed with light: subtrahend inputs SA and SB and minuend input M. Light modes are shown by intermitting black and white stripes, the blacker is the color the more intensive is the electric field. The input light modes are in the phase relationship, as explained above while referring to FIG. 4B. As it is seen from FIG. 6B, almost all light goes to drain $D_2$ in this case.

Figure 6C:
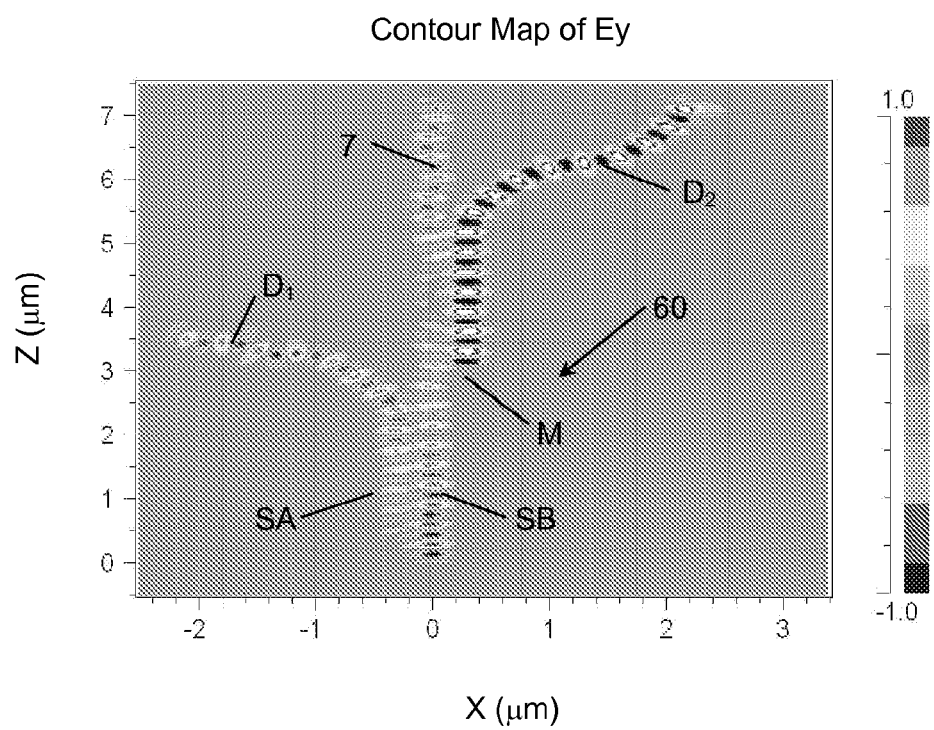
Figure 6D:
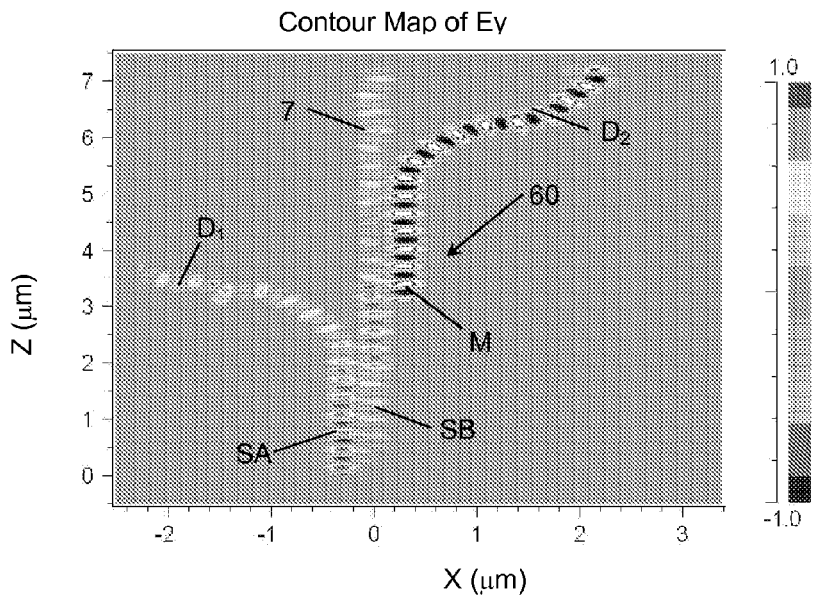

FIG. 6C illustrates the case in which input SB and minuend input M are fed with light. This light partially goes to drains $D_1$ and $D_2$ as well as output 7. Likewise, FIG. 6D illustrates the case in which input SA and minuend input M are fed with light. Output 7 again receives a substantial portion of input light, in contrast with FIG. 6B.

Figure 7A:
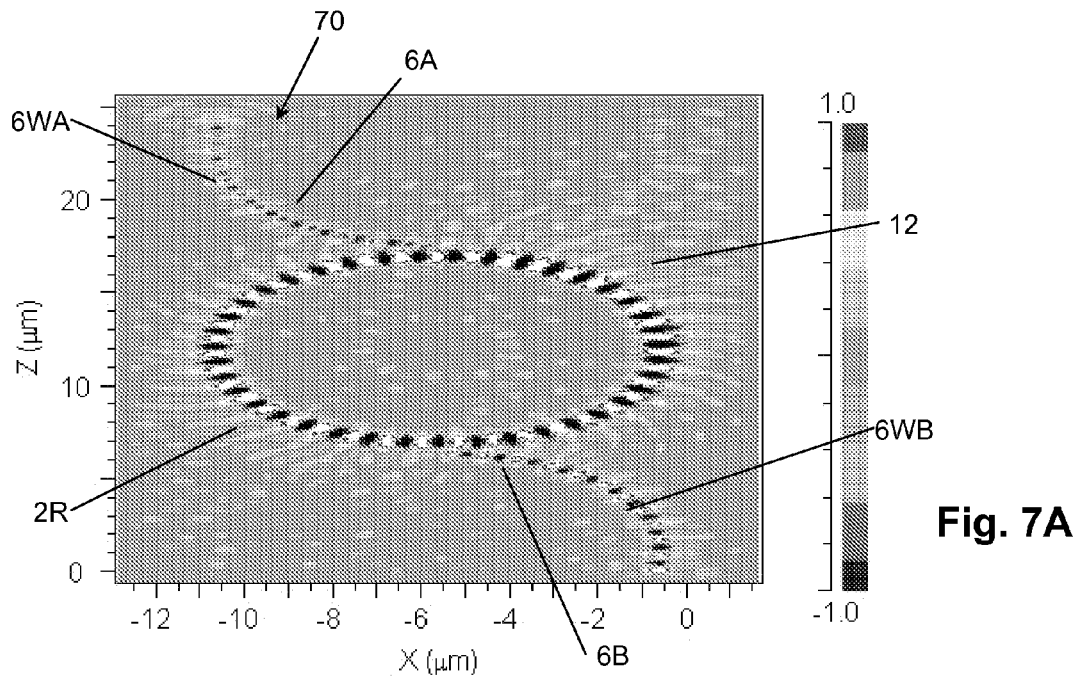
FIG. 7A shows an optical circuit capable of utilizing the non-linearity of a signal propagating through a gain medium on the signal duration and results of a simulation of signal propagation through this optical circuit.
Figure 7B:
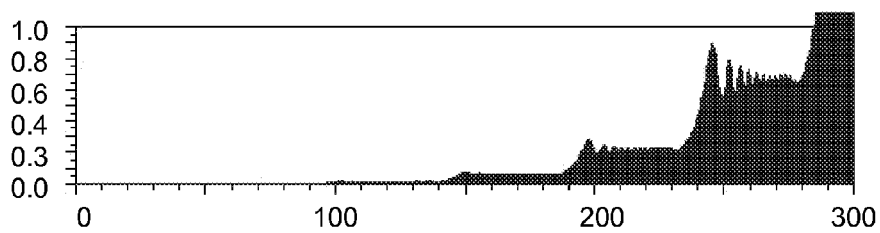
FIG. 7B shows a simulated intensity-time diagram of a signal resonating in a ring of the circuit shown in FIG. 7A.

Referring to FIGS. 7A and 7B, there are shown results of a simulation performed for an optical circuit 70, configured in accordance with the technique of the inventors in the sense that this circuit is configured for utilization of the nonlinear dependence of the amplitude of a signal passing through the gain medium on the duration of the signal (nonlinearity of a similar type is used in the above pulse train variant of the technique of the inventors; there, however, the nonlinearity was with respect to the duration of existence of the gain). Optical circuit 70, shown in FIG. 7A, includes a resonator ring 2R with two inputs 6A and 6B and an output 12 and two input waveguides 6WA and 6WB. The resonator ring has a gain medium thereinside; this gain is spread along the ring. A gain of the whole ring is less than 1, wherein the fact that a portion of light from the resonator ring leaks through output 12 is taken into account. Circuit 70 has a pump, which though is not shown, but does not have a depletion scheme. FIG. 7A illustrates an instantaneous distribution of the electric field energy in the circuit in a case in which two inputs are fed with light waves, and the light waves interfere coherently. It is seen, through the difference in variation of the black and white pattern in the ring and inputs of the circuit, that energy of a wave formed in the ring is larger than each of energies of waves provided at the inputs. In FIG. 7B there is shown a simulated dependence of intensity of the electromagnetic field at output 12 of circuit 70 on time for a case in which one of the circuit inputs is fed with a pulse of light. The dependence has a region of the step-exponential growth; each step corresponds to a revolution of the pulse. However, the dependence will saturate, as the gain of gain medium depends on the energy passing through it:

$$\gamma = \frac{\gamma_0}{1 + \frac{I_v}{I_{sat}}};$$

herein $\gamma$ is a gain per unit length, $I_v$ is the intensity of light in the gain medium and $I_{sat}$ is the saturation intensity level; gain $\gamma_0$ is a gain per unit length at zero light intensity. It may be noted, that a gain G of a full ring equals to $\exp(\gamma L)$, where L is the length of the gain medium.

Figure 8A:
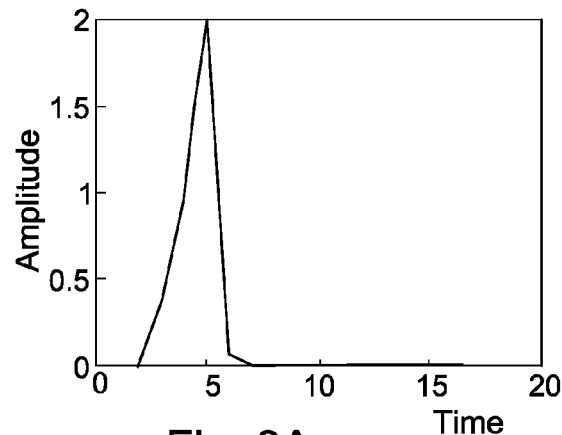
FIGS. 8A and 8B show results of another simulation of propagation of signals of various durations through a gain medium.
Figure 8B:
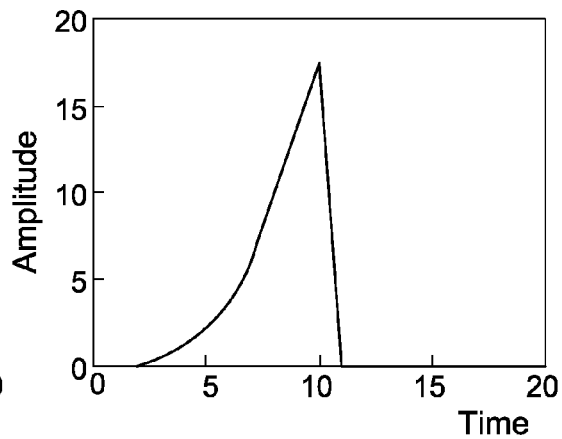

Simulations performed by the inventors have also demonstrated the effect of nonlinear growth of the signal pulse amplitude on the duration of the pulse. Results of the simulation are shown in FIGS. 8A and 8B. In FIG. 8A, an input pulse existed for 4 units of time (from mark 1 to mark 5 in the axis of time); in this period the input light was amplified and its maximum intensity reached mark 2 (in the axis of amplitudes). In FIG. 8B, the input pulse existed for 8 units of time (from mark 2 to mark 10 in the axis of time); in this period the input light was amplified and its maximum intensity reached a value of approximately 17 (in the axis of amplitudes). Therefore, output signal may be controlled by selection of duration of existence of the input pulse.

Figure 9:
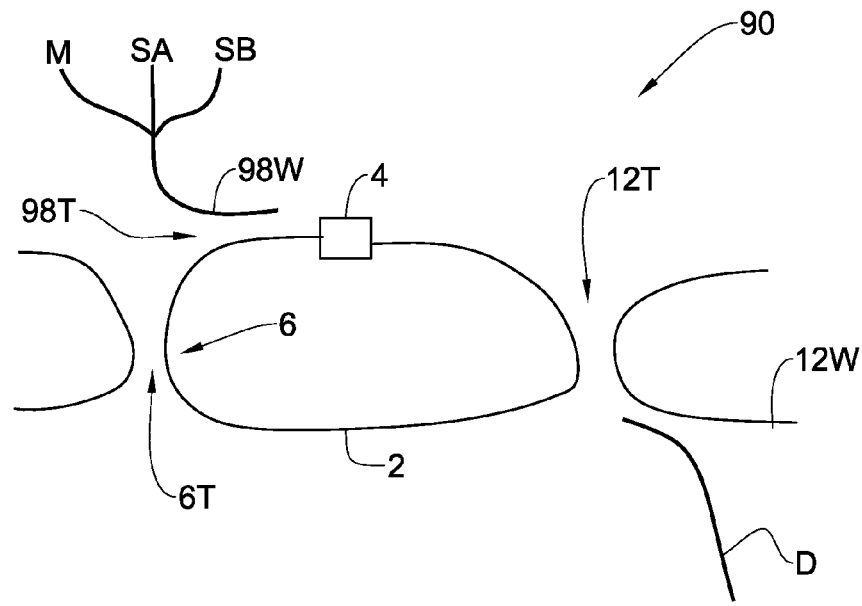
FIG. 9 presents yet another design of the optical gate of the invention usable as AND logical element.

Referring to FIG. 9, there is schematically presented yet another design of optical gate usable as AND logical element: a gate 90. In contrast with the design of FIG. 4A, in the present design an output of the subtractor-type unit is coupled into the amplification waveguide (closed loop waveguide); the coupling is provided by a coupling junction 98T from a waveguide 98W, such that the control light propagates along closed loop waveguide 2. In the present example, the closed loop waveguide is multimode: it carries a mode exited by the reference light and a mode excited by the control light. The closed loop waveguide is a resonator for both modes. The control light may be weak, but efficiently utilized for controlling the gain experienced by the reference light: the mode that is excited by the control light increases in the closed loop waveguide thanks to the gain and the loop's resonating properties and therefore this mode decreases the gain left for the mode of the reference light, in accordance with the above saturation formula. The gain and the resonator may amplify the control light mode even to a such degree that this mode will start losing its energy to output waveguide 12W in a quantity masking the output mode itself (i.e. the mode generated by the reference light passed through coupling region 6T, closed loop 2, and coupling region 12T). To prevent the masking, optical circuit 90 may be provided with an optional part—a drain D, to which the mode excited by the control light will go.

Figure 10A:
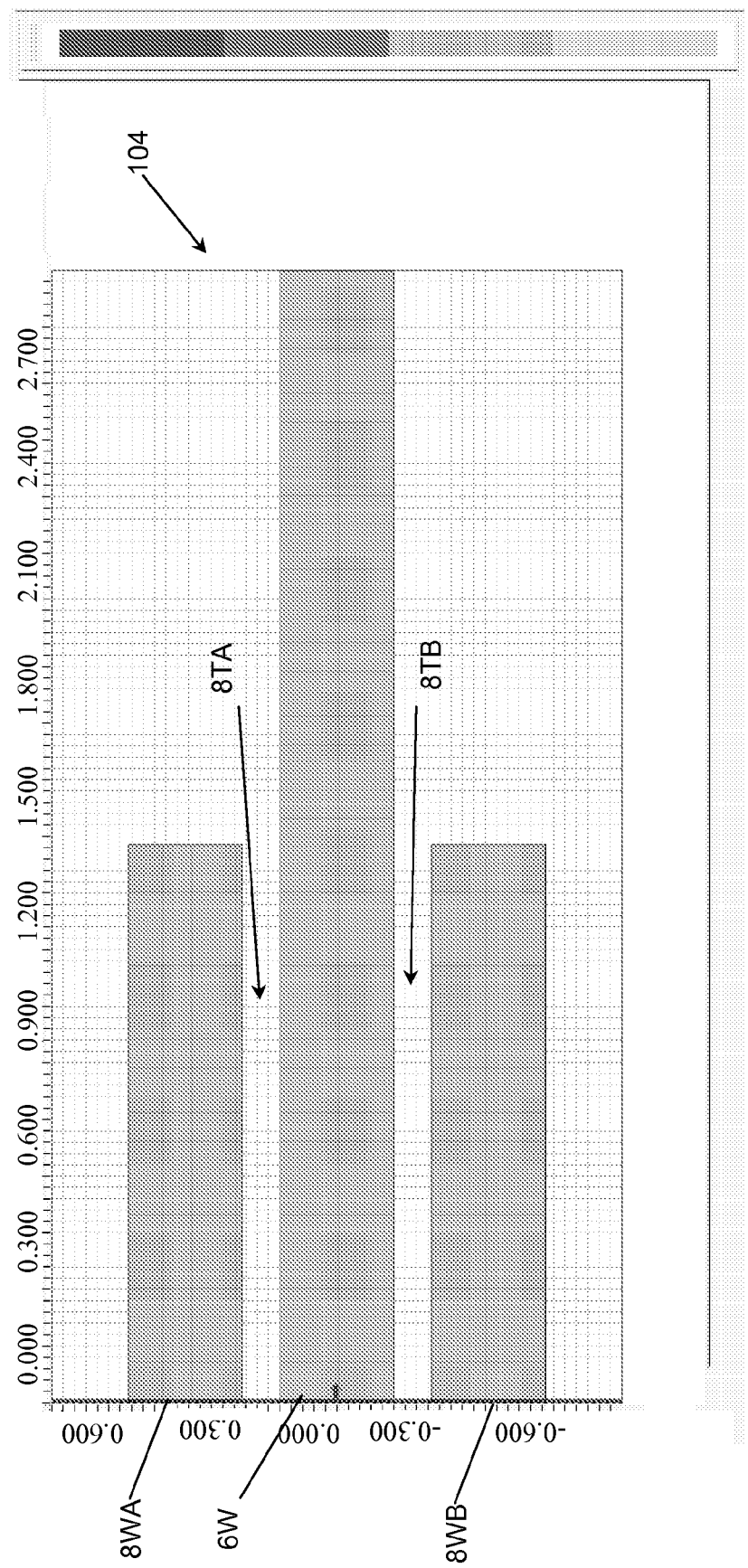
FIGS. 10A-10G illustrate a coupler usable in optical logic circuits and results of a simulation of coupler operation for different combinations of coupler input signals.

Referring to FIGS. 10A-10G, there is illustrated an input section 104 of yet another device, configured in accordance with the technique of the inventors, and results of a simulation of light propagation through this section. The device and the input section are usable for optical signal control and usable as a logic element, in particular NOR element; an output section of the device is not shown as its structure and operation can be understood from the explanations that will be given now with regards to structure and operation of the input section and from the specification as a whole. The input section layout is shown in FIG. 10A. Section 104 includes a reference waveguide 6W and two control waveguides 8WA and 8WB. Each of the control waveguides allows propagation of a mode of light coupling into the reference waveguide; respective coupling regions are marked as 8TA and 8TB. Further along waveguide 6W a pumpable medium is situated (though not shown in the figure); the reference waveguide thus becomes an amplification waveguide 2. Reference waveguide 6W allows propagation of at least two modes of light of the same or close energy, such that the pumpable medium amplifies each of these modes and depletion of the pumped medium by one of the modes substantially reduces an amplification factor for the other(s) modes. Coupling regions 8TA and 8TB are such that control mode(s) from control waveguides couple(s) into the amplification waveguide to a larger degree than the reference mode from the reference waveguide couples into the control waveguides.

Operation of section 104 is thus based on principles similar to those mentioned with reference to FIG. 2. Results of simulation of the operation of section 104 are illustrated in FIGS. 10B-10G.

Figure 10B:
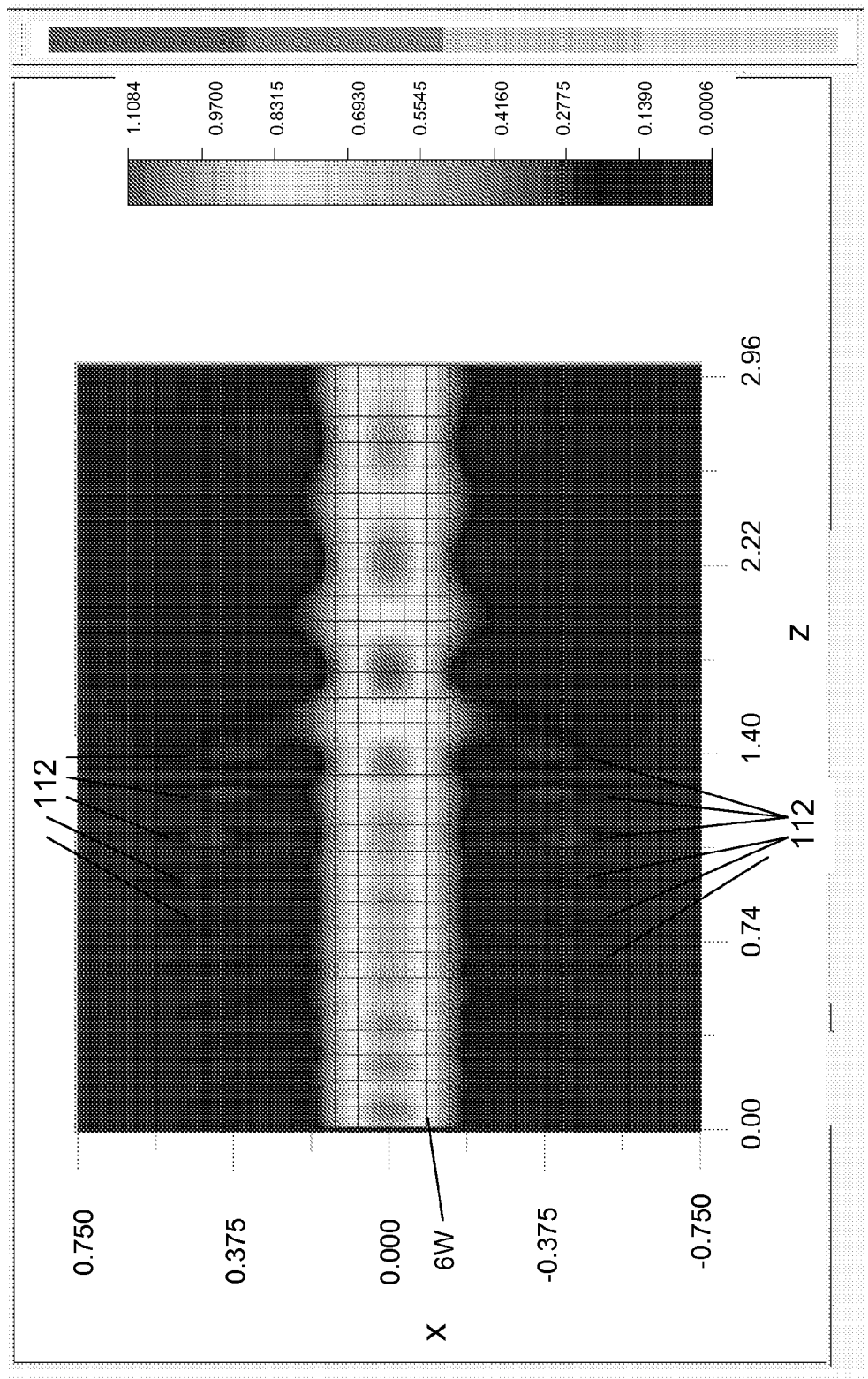

In FIG. 10B the reference mode (0-order mode, with a peak of energy density near the fiber's central axis—regions with higher intensity of the field are shown with whiter color) is passed through waveguide 6W; control inputs do not receive light. It is seen, that the reference mode creates electromagnetic fields 112A and 112B because it "attempts" to tunnel to waveguides 8WA and 8WB through coupling junctions 8TA and 8TB, but it does not lose much energy because the coupling regions are almost not coupling for the 0-order mode.

Figure 10C:
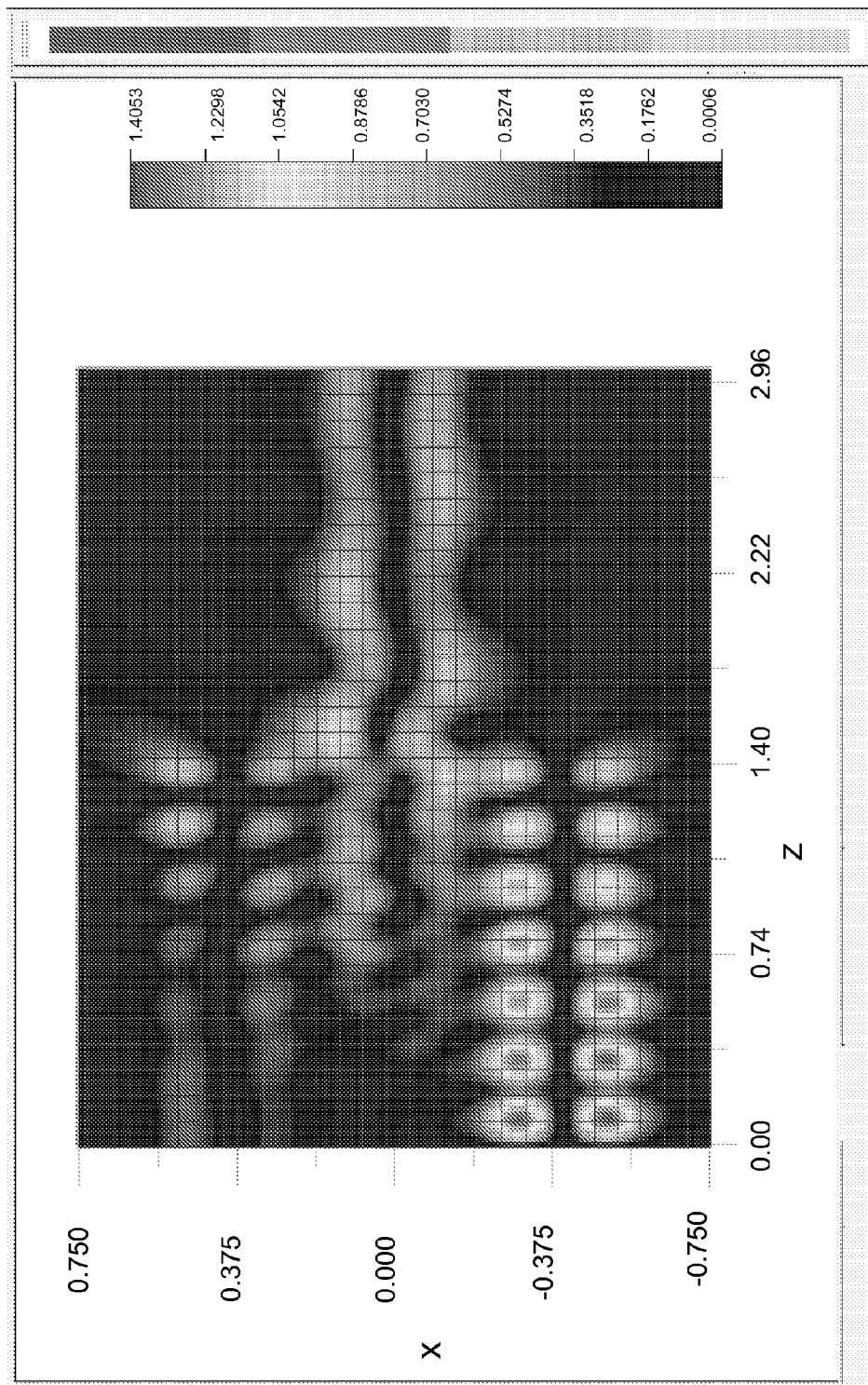

In FIG. 10C the control mode (1-order mode, with two peaks of energy density removed from the fiber's central axis) is passed through control waveguide 8WB; waveguides 6W and 8WA do not receive light. It is seen, that the 1-order mode to a large extent couples into the amplification waveguide. Moreover, it remains to be the 1-order mode after the coupling.

Figure 10D:
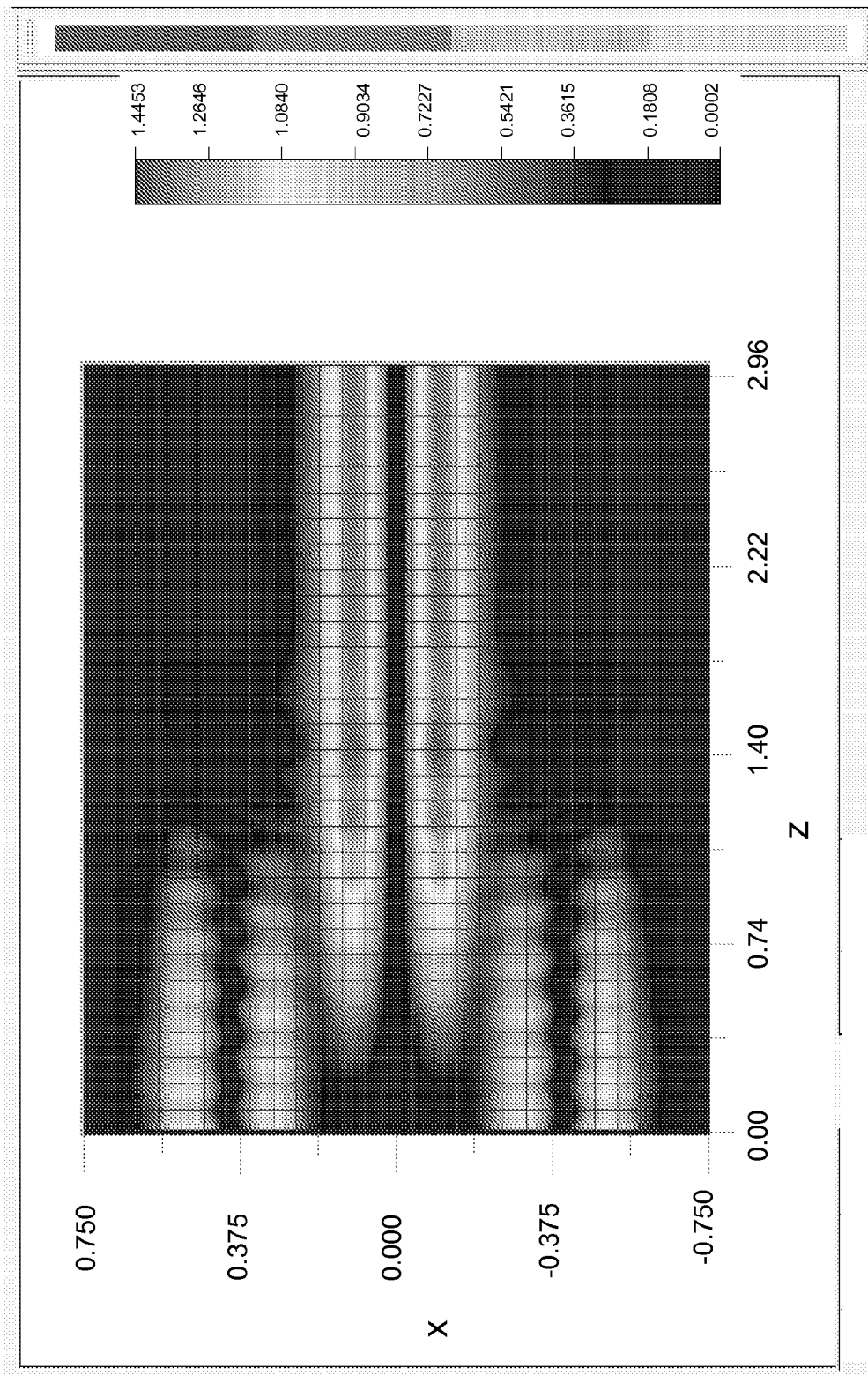

In FIG. 10D the control mode is passed through both control waveguides; the reference waveguides again does not receive light. It is seen that again that the 1-order mode to a large extent couples into the amplification waveguide and the mode remains to be of the 1-order after the coupling.

Figure 10E:
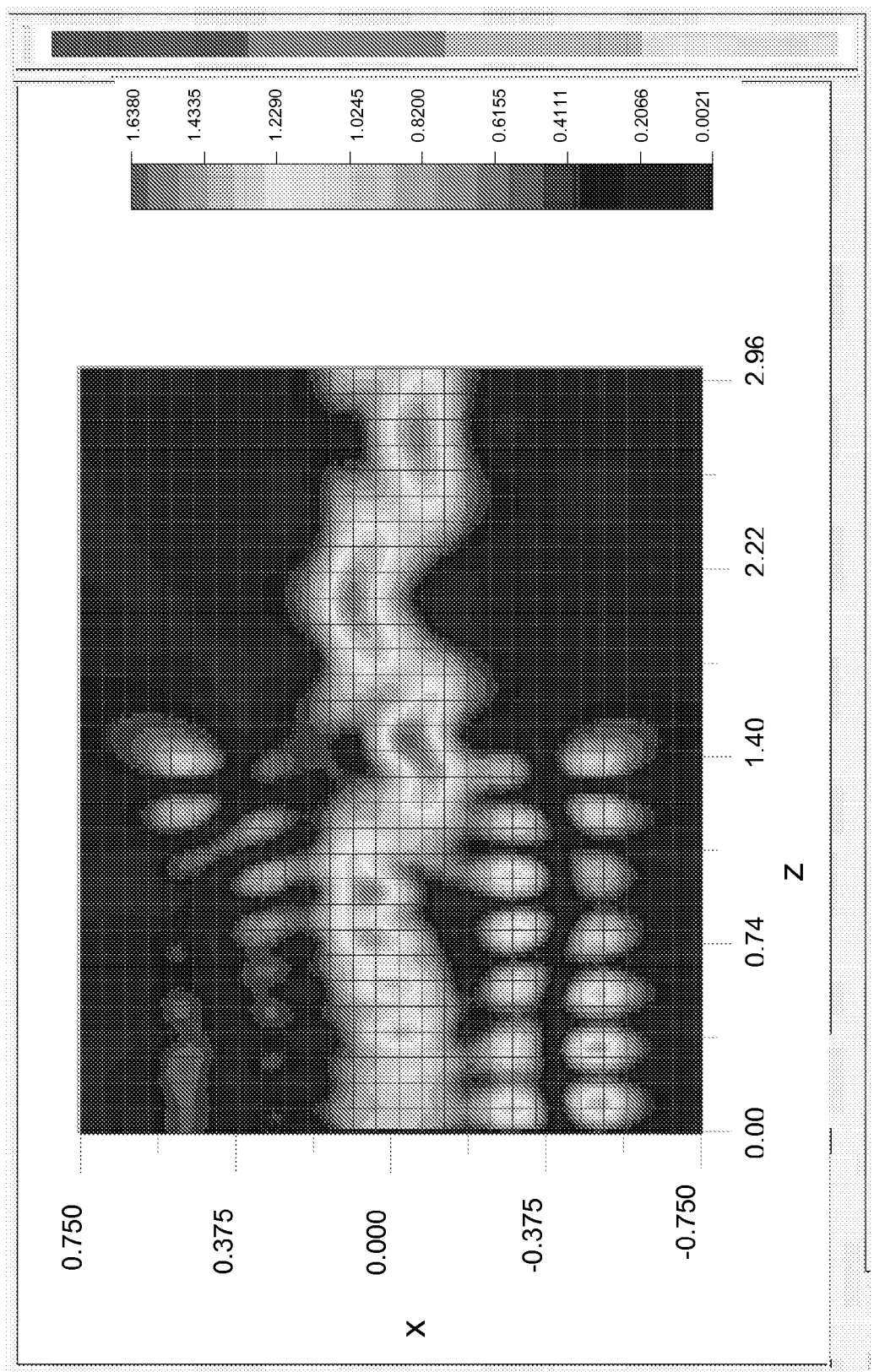

In FIG. 10E reference waveguide 6W and control waveguide 8WB are fed with respectively the reference mode (0-order mode) and the control mode (1-order mode). It is seen that the amplification waveguide thus keeps the 0-order mode, collects the 1-order mode, and passes a mixture of the two modes.

Figure 10F:
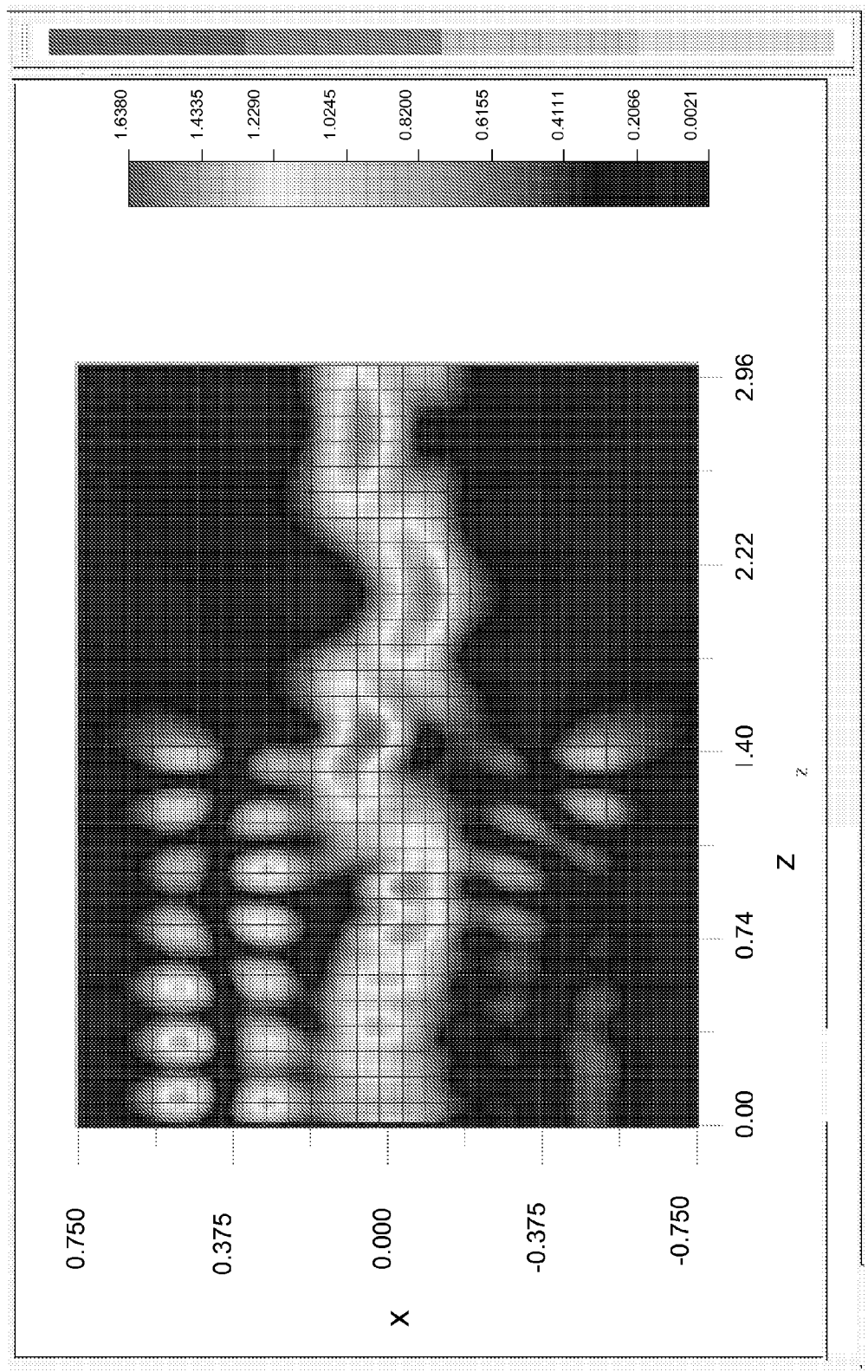

FIG. 10F is symmetrical to FIG. 10E: now control waveguide 8WA receives the control mode, and control waveguide 8WB does not. The amplification waveguide however still receives the 1-order mode.

Figure 10G:
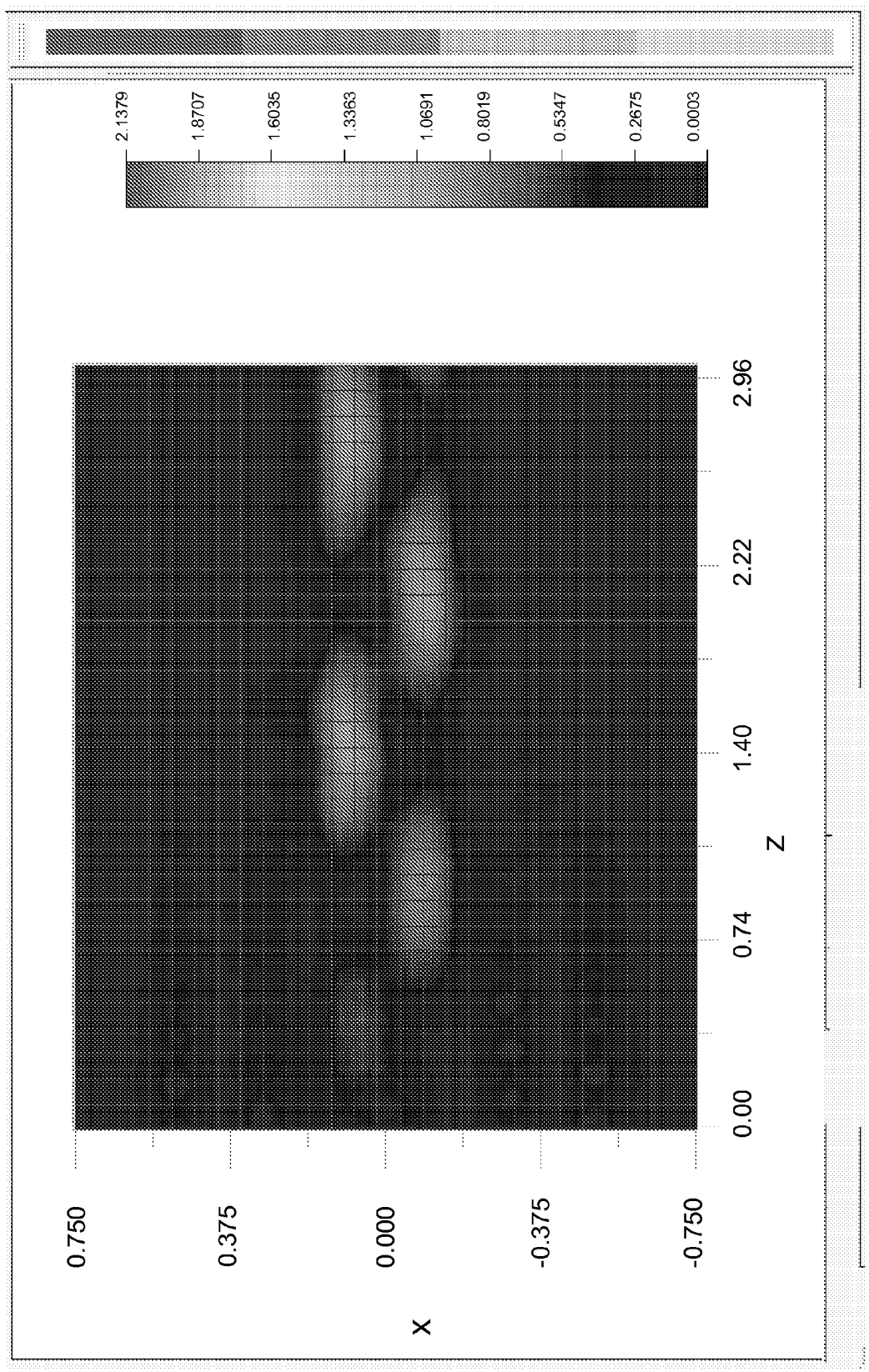

Finally, in FIG. 10G all input signals are present and the amplification waveguide receives yet another mixture of 0-order mode and 1-order mode.

Therefore, as mentioned above, section 104 is usable for example as an input section of NOR element: the 1-order mode, when present, will deplete the amplification medium and reduce the amplification of the 0-order mode.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device for optical signal control, the device comprising
   an amplification waveguide comprising a pumpable medium,
   a reference input,
   a control input,
   an output,
      wherein the reference input, the control input, and the output selectively allow transmission of reference light into and out of the amplification waveguide,
   a transmission circuit, formed by the reference input, the amplification waveguide, and the output, for transmitting the reference light through the pumpable medium from the reference input to the output, and
   a depletion circuit for the pumpable medium and control light, the depletion circuit formed by the control input and the amplification waveguide,
   wherein the control light via the control input depletes the pumpable medium when the pumpable medium is pumped, and
   wherein the device is capable of controlling an output signal, formed by the transmission of the reference light through the pumpable medium from the reference input to the output, by the controllable depletion of the pumpable medium.

2. The device of claim 1, further comprising a pump input arranged to selectively allow transmission of pumping light into the amplification waveguide, the pump input and the amplification waveguide defining a pumping circuit for the pumpable medium.

3. The device of claim 2, having one of the following configurations: said pumping circuit is configured to be substantially restrictive towards a propagation of the pumping light out of said output; and said amplification waveguide forms a resonator for the pumping light propagating by the pumping circuit.

4. The device of claim 1, further comprising a pump.

5. The device of claim 1, having one of the following configurations: said reference input comprises a reference waveguide and a reference coupling junction formed between the reference and the amplification waveguides, said reference coupling junction being adapted for coupling reference light signal from said reference waveguide into said amplification waveguide; and said output comprises an output waveguide and an output coupling junction formed between the amplification and the output waveguides, said output coupling junction being adapted for coupling light from said amplification waveguide into said output waveguide.

6. The device of claim 1, wherein said amplification waveguide has one of the following configurations: is a closed circuit waveguide; is a single-mode waveguide; has at least two propagation modes, the control light in said depletion scheme propagating in a propagation mode different from a propagation mode of the reference light.

7. The device of claim 1, wherein said amplification waveguide is a closed circuit amplification waveguide, being a resonator for a mode of the reference light.

8. The device of claim 1, wherein said depletion circuit is substantially restrictive towards a propagation of the control light out of said output.

9. The device of claim 1, having one of the following configurations: said control input comprises a control waveguide and a control coupling junction formed between the control and the amplification waveguides, said control coupling junction being adapted for coupling control light from the control waveguide into the amplification waveguide; comprises at least two control inputs, each of said control inputs comprising a control waveguide and a control coupling junction formed between the control and the amplification waveguides, said control coupling junction being adapted to couple control light from the control waveguide into the amplification waveguide.

10. The device of claim 1, further comprising a drain output selectively allowing transmission of the control light from the device, the drain output being downstream of the depletion circuit.

11. The device of claim 10, wherein the drain output comprises a drain waveguide and a drain coupling junction formed between the amplification and the drain waveguides, said drain coupling junction being adapted for coupling light from the amplification waveguide into the drain waveguide.

12. The device of claim 1, comprising at least two control inputs arranged to provide one or more depletion schemes, the device being enabled to output a logical function of at least two control signals.

13. The device of claim 11, wherein said logical function is NOR.

14. The device of claim 1, comprising at least two control inputs arranged to provide one or more depletion schemes, the device being enabled to output logical function AND of at least two control signals.

15. The device of claim 1, wherein the control input comprises a subtractor comprising at least three inputs one of which is utilizable as a minuend input and at least two of which are utilizable as subtrahend inputs.

* * * * *